United States Patent
Warkentin et al.

(10) Patent No.: US 12,175,257 B2
(45) Date of Patent: Dec. 24, 2024

(54) PROVISIONING DPU MANAGEMENT OPERATING SYSTEMS USING HOST AND DPU BOOT COORDINATION

(71) Applicant: VMware, Inc., Palo Alto, CA (US)

(72) Inventors: Andrei Warkentin, South Elgin, IL (US); Sunil Kotian, San Jose, CA (US)

(73) Assignee: VMware LLC, Palo Alto, CA (US)

(*) Notice: Subject to any disclaimer, the term of this patent is extended or adjusted under 35 U.S.C. 154(b) by 310 days.

(21) Appl. No.: 17/715,288

(22) Filed: Apr. 7, 2022

(65) Prior Publication Data
US 2023/0325203 A1    Oct. 12, 2023

(51) Int. Cl.
*G06F 9/4401* (2018.01)

(52) U.S. Cl.
CPC .......... *G06F 9/4416* (2013.01); *G06F 9/4406* (2013.01)

(58) Field of Classification Search
None
See application file for complete search history.

(56) References Cited

U.S. PATENT DOCUMENTS

| | | | |
|---|---|---|---|
| 10,467,019 B2* | 11/2019 | York | H04L 67/06 |
| 2022/0350618 A1* | 11/2022 | Kurian | H04L 63/166 |
| 2023/0325198 A1* | 10/2023 | Paulraj | G06F 9/4401 |
| | | | 713/2 |

* cited by examiner

*Primary Examiner* — Fahmida Rahman
(74) *Attorney, Agent, or Firm* — King Intellectual Asset Management

(57) ABSTRACT

Disclosed are various examples of provisioning a data processing unit (DPU) management operating system (OS). A host device boots a host provisioning image, which executes a host provisioning agent. The host provisioning agent launches a server component that serves a DPU management OS. A provisioning command is transmitted to a DPU device installed to the host device. The server component transmits the DPU management OS from the host device to the DPU device. A host OS is executed once an indication that the DPU device is executing on the DPU management OS is received.

20 Claims, 4 Drawing Sheets

PROVISIONING DPU MANAGEMENT OPERATING SYSTEMS USING HOST AND DPU BOOT COORDINATION

BACKGROUND

Management Enterprises can employ a management service that uses virtualization to provide the enterprise with access to software, data, and other resources. The management service use host devices to execute workloads that provide software services for enterprise activities. The enterprises can use other host devices to access these workloads.

Data processing units (DPUs) can be physically installed to the various host devices. These DPUs can include processors, a network interface, and in many cases can include acceleration engines capable of machine learning, networking, storage, and artificial intelligence processing. The DPUs can include processing, networking, storage, and accelerator hardware. However, DPUs can be made by a wide variety of manufacturers. The interface and general operations can differ from DPU to DPU.

This can pose problems for management services and enterprises that desire to fully utilize the capabilities of DPUs in host devices. There is a need for better mechanisms that can integrate DPUs into a virtualization and management solution.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
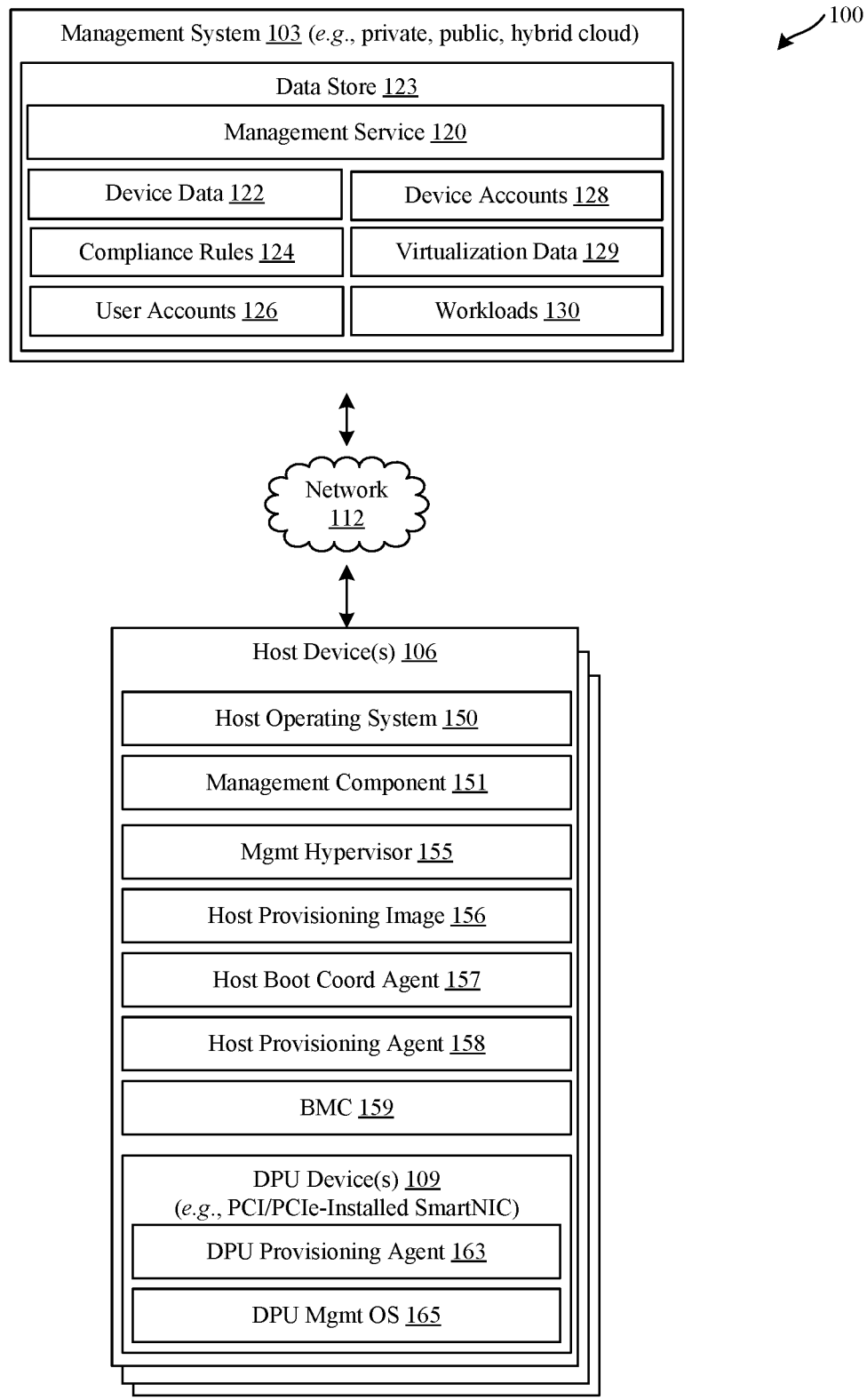
FIG. 1 is a drawing of an example of a networked environment that includes components that provision data processing unit (DPU) management operating systems using boot coordination agents, according to the present disclosure.

The present disclosure relates to provisioning data processing unit (DPU) management operating systems using boot coordination agents. This can include provisioning DPU management operating systems without third-party integration of a DPU with custom hardware, custom firmware, or special boot time or pre-boot communication channel with a host device. The disclosure provides mechanisms that can provision a DPU with a DPU management operating system (OS). A DPU can be physically installed to a host device. The DPU can include processors, a network interface, and in many cases can include acceleration engines capable of machine learning, networking, storage, and artificial intelligence processing. However, DPUs can be made by a wide variety of manufacturers. The interface and general operation can differ from DPU to DPU. This can pose problems for management services and enterprises that desire to fully utilize the capabilities of DPUs in host devices. The present disclosure describes mechanisms that can provision DPUs for use in virtualization and management solutions by provisioning DPU management operating systems.

Host devices and DPU devices do not generally allow for the DPU device to stay operating when the host device is powered off. As a result, a DPU device cannot fully proxy for all operations, or operate in a role similar to that of a baseboard management controller (BMC). The system can enable a DPU management operating system to be resilient to arbitrary resets that occur as part of host device reboots and shutdowns.

Since DPU devices are installed to a host device, a DPU device can be designed to be stateless and incapable of self-corruption. A DPU management operating system can abstract storage and network for security as well as management reasons, so a host system can be completely isolated and incapable of network communications with a local area network (LAN) or wide area network (WAN) until the DPU management operating system boots. In some examples, the DPU device can provide the networking capabilities of the host device and can prevent any communications until the DPU management operating system boots.

DPU management operating system provisioning can be performed without third party infrastructure and without shared resources between multiple hosts. The DPU management operating system can be a stateless operating system that does not write states to local flash storage of the DPU device and does not require flash storage drivers. The DPU management operating system can handle unexpected shutdowns such as power failures, host resets, host power-offs, and so on. The DPU management operating system can boot from an image or installation to local flash media but does not write to the local storage device. Link-local addresses can be used as a channel for host-to-DPU communication. The DPU device always has a known IP address that simplifies locating the provisioning agent for the DPU management operating system to synchronize host operating system 150 boots with DPU management operating system boots.

While discussed in the singular herein for clarity purposes, the host device boot sequence can coordinate with multiple DPU devices installed to the host device. In some examples, a single one of the DPU devices can use a host operating system 150 communication channel, for example, for guest tools. This can be considered a control DPU device. The control DPU device can, once all DPU management operating systems on all DPU devices boot, can respond to the host device. The control DPU device can correspond to the DPU management operating system instance and DPU device responsible for the default network route for the host device.

Virtual Machine Communication Interface (VMCI)-over-IP can be utilized to handle high-level integration between the host device operating system (and other software components) and the DPU management operating system (and other software components). The described solutions use host-DPU device internal networking, but to not require software of the host device or DPU device to access a management service or other LAN or WAN accessed resources for provisioning. Configuration changes for the DPU device that are provided by the management service can be pended until the DPU management operating system boots up and requests the updates. Until the DPU device is provisioned with the DPU management operating system and/or the DPU management operating system boots, a provisioning agent, or other instructions on the DPU device can prevent external networking access outside of the host device internal bus or internal network.

Provisioning can generally refer to booting a host-specific filesystem, an DPU management operating system provisioning image. This can repave or prepare the DPU device and prepare the host device to boot its operating system thereafter. The DPU management operating system provisioning image can be created using a management service. The DPU management operating system provisioning image can include a host provisioning agent, the DPU management operating system for the DPU device, credentials for registering or communicating back to a management service, metadata for DPU software device networking (SDN), a desired IP address for host-DPU communications, among other components. The host provisioning agent can include a Unified Extensible Firmware Interface (UEFI) application.

With reference to FIG. 1, shown is an example of a networked environment 100. The networked environment 100 can include a management system 103, host devices 106, and other components in communication with one another over a network 112. DPU devices 109 can be installed to the host devices 106. In some cases, host devices 106 can include computing devices or server computing devices of a private cloud, public cloud, hybrid cloud, and multi-cloud infrastructures. Hybrid cloud infrastructures can include public and private host computing devices. Multi-cloud infrastructures can include multiple different computing platforms from one or more service providers in order to perform a vast array of enterprise tasks.

The host devices 106 can also include devices that can connect to the network 112 directly or through an edge device or gateway. The components of the networked environment 100 can be utilized to provide virtualization solutions for an enterprise. The hardware of the host devices 106 can include physical memory, physical processors, physical data storage, and physical network resources that can be utilized by virtual machines. Host devices 106 can also include peripheral components such as the DPU devices 109. The host devices 106 can include physical memory, physical processors, physical data storage, and physical network resources. Virtual memory, virtual processors, virtual data storage, and virtual network resources of a virtual machine can be mapped to physical memory, physical processors, physical data storage, and physical network resources of the host devices 106. The management hypervisor 155 can provide access to the physical memory, physical processors, physical data storage, and physical network resources of the host devices 106 to perform workloads 130.

The DPU devices 109 can include networking accelerator devices, smart network interface cards, or other cards that are installed as a peripheral component. The DPU devices 109 themselves can also include physical memory, physical processors, physical data storage, and physical network resources. The DPU devices 109 can also include specialized physical hardware that includes accelerator engines for machine learning, networking, storage, and artificial intelligence processing. Virtual memory, virtual processors, virtual data storage, and virtual network resources of a virtual machine can be mapped to physical memory, physical processors, physical data storage, physical network resources, and physical accelerator resources of the DPU devices 109.

The DPU management operating system 165 can communicate with the management hypervisor 155 and/or with the management service 120 directly to provide access to the physical memory, physical processors, physical data storage, physical network resources, and physical accelerator resources of the DPU devices 109. However, the DPU management operating system 165 may not be initially installed to the DPU device 109.

Virtual devices including virtual machines, containers, and other virtualization components can be used to execute the workloads 130. The workloads 130 can be managed by the management service 120 for an enterprise that employs the management service 120. Some workloads 130 can be initiated and accessed by enterprise users through client devices. The virtualization data 129 can include a record of the virtual devices, as well as the host devices 106 and DPU devices 109 that are mapped to the virtual devices. The virtualization data 129 can also include a record of the workloads 130 that are executed by the virtual devices.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include one or more host or server computers, and any other system providing computing capability. In some examples, a subset of the host devices 106 can provide the hardware for the management system 103. While referred to in the singular, the management system 103 can include a plurality of computing devices that are arranged in one or more server banks, computer banks, or other arrangements. The management system 103 can include a grid computing resource or any other distributed computing arrangement. The management system 103 can be multi-tenant, providing virtualization and management of workloads 130 for multiple different enterprises. Alternatively, the management system 103 can be customer or enterprise-specific.

The computing devices of the management system 103 can be located in a single installation or can be distributed among many different geographical locations which can be local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided using a management service 120 that includes a scheduling service and a number of software components that operate in concert to provide compute, memory, network, and data storage for enterprise workloads and data. The management service 120 can also provide access to the enterprise workloads and data executed by the host devices 106 and can be accessed using client devices that can be enrolled in association with a user account 126 and related credentials.

The management service 120 can communicate with associated management instructions executed by host devices 106, client devices, edge devices, and IoT devices to ensure that these devices comply with their respective compliance rules 124, whether the specific host device 106 is used for computational or access purposes. If the host devices 106 or client devices fail to comply with the compliance rules 124, the respective management instructions can perform remedial actions including discontinuing access to and processing of workloads 130.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash drives. The data store 123 can include a data store 123 of the management system 103, mass storage resources of the management system 103, or any other storage resources on which data can be stored by the management system 103. The data store 123 can also include memories such as RAM used by the management system 103. The RAM can include static RAM (SRAM), dynamic RAM (DRAM), synchronous DRAM (SDRAM), and other types of RAM.

The data stored in the data store 123 can include management data including device data 122, enterprise data, compliance rules 124, user accounts 126, and device accounts 128, as well as other data. Device data 122 can identify host devices 106 by one or more device identifiers, a unique device identifier (UDID), a media access control (MAC) address, an internet protocol (IP) address, or another identifier that uniquely identifies a device with respect to other devices.

The device data 122 can include an enrollment status indicating whether a computing device, including a DPU device, is enrolled with or managed by the management service 120. For example, an end-user device, an edge device, IoT device, host device 106, client device, or other devices can be designated as "enrolled" and can be permitted to access the enterprise workloads and data hosted by host devices 106, while those designated as "not enrolled," or having no designation, can be denied access to the enterprise resources. The device data 122 can further include indications of the state of IoT devices, edge devices, end user devices, host device 106, DPU devices 109 and other devices. For example, the device data 122 can indicate that a host device 106 includes a DPU device 109 that has a DPU management operating system 165 installed. This can enable providing remotely-hosted management services to the host device 106 through or using the DPU device 109. This can also include providing management services to other remotely-located client or host devices 106 using resources of the DPU device 109. While a user account 126 can be associated with a particular person as well as client devices, a device account 128 can be unassociated with any particular person, and can nevertheless be utilized for an IoT device, edge device, or another client device that provides automatic functionalities.

Device data 122 can also include data pertaining to user groups. An administrator can specify one or more of the host devices 106 as belonging to a user group. The user group can refer to a group of user accounts 126, which can include device accounts 128. User groups can be created by an administrator of the management service 120.

Compliance rules 124 can include, for example, configurable criteria that must be satisfied for the host devices 106 and other devices to be in compliance with the management service 120. The compliance rules 124 can be based on a number of factors, including geographical location, activation status, enrollment status, and authentication data, including authentication data obtained by a device registration system, time, and date, and network properties, among other factors associated with each device. The compliance rules 124 can also be determined based on a user account 126 associated with a user.

Compliance rules 124 can include predefined constraints that must be met in order for the management service 120, or other applications, to permit host devices 106 and other devices access to enterprise data and other functions of the management service 120. The management service 120 can communicate with management instructions on the client device to determine whether states exist on the client device which do not satisfy one or more of the compliance rules 124. States can include, for example, a virus or malware being detected; installation or execution of a blacklisted application; and/or a device being "rooted" or "jailbroken," where root access is provided to a user of the device. Additional states can include the presence of particular files, questionable device configurations, vulnerable versions of applications, vulnerable states of the client devices or other vulnerability, as can be appreciated. While the client devices can be discussed as user devices that access or initiate workloads 130 that are executed by the host devices 106, all types of devices discussed herein can also execute virtualization components and provide hardware used to host workloads 130.

The management service 120 can oversee the management and resource scheduling using hardware provided using host devices 106 and DPU devices 109. The management service 120 can oversee the management and resource scheduling of services that are provided to the host devices 106 and DPU devices 109 using remotely located hardware. The management service 120 can transmit various software components, including enterprise workloads, enterprise data, and other enterprise resources for processing and storage using the various host devices 106. The host devices 106 can include host devices 106 such as a server computer or any other system providing computing capability, including those that compose the management system 103. Host devices 106 can include public, private, hybrid cloud and multi-cloud devices that are operated by third parties with respect to the management service 120. The host devices 106 can be located in a single installation or can be distributed among many different geographical locations which can be local and/or remote from the other components.

The host devices 106 can include DPU devices 109 that are connected to the host device 106 through a universal serial bus (USB) connection, a Peripheral Component Interconnect Express (PCI-e) or mini-PCI-e connection, or another physical connection. DPU devices 109 can include hardware accelerator devices specialized to perform artificial neural networks, machine vision, machine learning, and other types of special purpose instructions written using CUDA, OpenCL, C++, and other instructions. The DPU devices 109 can utilize in-memory processing, low-precision arithmetic, and other types of techniques. The DPU devices 109 can have hardware including a network interface controller (NIC), CPUs, data storage devices, memory devices, and accelerator devices.

The management service 120 can include a scheduling service that monitors resource usage of the host devices 106, and particularly the host devices 106 that execute enterprise workloads 130. The management service 120 can also track resource usage of DPU devices 109 that are installed on the host devices 106. The management service 120 can track the resource usage of DPU devices 109 in association with the host devices 106 to which they are installed. The management service 120 can also track the resource usage of DPU devices 109 separately from the host devices 106 to which they are installed.

In some examples, the DPU devices 109 can execute workloads 130 assigned to execute on host devices 106 to which they are installed. For example, the management hypervisor 155 can communicate with a DPU management operating system 165 to offload all or a subset of a particular workload 130 to be performed using the hardware resources of a DPU device 109. Alternatively, the DPU devices 109 can execute workloads 130 assigned, by the management service 120, specifically to the DPU device 109 or to a virtual device that includes the hardware resources of a DPU device 109. In some examples, the management service 120 can communicate directly with the DPU management operating system 165, and in other examples the management service 120 can use the management hypervisor 155 to communicate with the DPU management operating system 165. The management service 120 can use DPU devices 109 to provide the host device 106 with access to workloads 130 executed using the hardware resources of another host device 106 or DPU device 109.

The host device 106 can include a management component 151. The management component 151 can communicate with the management service 120 for scheduling of workloads 130 executed using virtual resources that are mapped to the physical resources of one or more host device 106. The management component 151 can communicate with the management hypervisor 155 to deploy virtual devices that perform the workloads 130. In various embodiments, the management component 151 can be separate from, or a component of, the management hypervisor 155. The management component 151 can additionally or alternatively be installed to the DPU device 109. The management component 151 of a DPU device 109 can be separate from, or a component of, the DPU management operating system 165.

The host device 106 can include a management hypervisor 155, a host provisioning image 156, a host boot coordination agent 157, a host provisioning agent 158, and a baseboard management controller (BMC) 159. The DPU device 109 can include a DPU management operating system 165 and a DPU provisioning agent 163.

The host provisioning image 156 can include the host boot coordination agent 157, the host provisioning agent 158, a DPU management operating system 165 as an image or installer, and DPU provisioning data used by the DPU management operating system 165. The DPU provisioning data can include Software-Defined Networking (SDN) information, a desired Internet protocol (IP) address or other network address for DPU management operating system 165 communications, credentials to authenticate with the management service 120, a WAN-distributed edge configuration, as well as network storage configurations.

The host provisioning image 156 can initially boot to the host provisioning agent 158. The host provisioning image 156 or the host provisioning agent 158 can install the host boot coordination agent 157 on the host device 106. The host boot coordination agent 157 and the host provisioning agent 158 can each be provided as one or more bootable file or boot loader executable. The bootable file or boot loader executable can include an Extensible Firmware Interface (EFI) file with an EFI file extension. While EFI files can be used for Unified Extensible Firmware Interface (UEFI) enabled computer system, other file types can also be used. Another bootable file or boot loader executable can be provided as an installer of the DPU management operating system 165 and the DPU provisioning data. Profiles and other configurations can be included as an archive file or a size reduced or compressed archive file. Archive files can include a TAR extension or other file extension. Reduced or compressed archive files can include a TGZ file extension or another file extension.

The host provisioning image 156 can be created by the management service 120. The management service 120 can use the BMC 159 to set boot options and order to boot the host provisioning image 156, and to restart the host device 106. The BMC 159 can include a BMC interface that enables this functionality. In some cases, the management service 120 can transmit a command for the management component 151 of the host device 106 to cause the host device 106 to mount and execute the host provisioning image 156. The management component 151 can use the interface of the BMC 159 to set boot options and order to boot the host provisioning image 156, and to restart the host device 106. The host provisioning image 156 can also be delivered using a device directly connected to an interconnect port of the host device 106, such as a removable universal serial bus (USB) port, a FireWire (IEEE 1394) port, or a memory card reader. The host provisioning agent 158 can include a server component that can serve the DPU management operating system 165 as well as the DPU provisioning data as an image or as an installer file.

Generally, the host provisioning image 156 can be mounted and booted by the host device 106. The host provisioning image 156 can initially boot the host provisioning agent 158. This can install the host boot coordination agent 157 as a host sysprep boot option of the host device 106, and can serve the DPU management operating system 165 and the DPU provisioning agent 163. The DPU provisioning agent 163 of the DPU device 109 can retrieve the DPU management operating system 165 along with the DPU provisioning data and other data served up for the DPU provisioning process.

The host boot coordination agent 157 can include a boot loader executable that can be installed as a host sysprep boot option. The host provisioning agent 158 can be a boot loader executable that boots automatically when the host provisioning image 156 is booted.

The DPU provisioning agent 163 can beside loaded or preinstalled to the DPU device 109. In some examples, the DPU provisioning agent 163 can be provided to a manufacturer of the DPU device 109, or to an owner or operator of the DPU device 109. The DPU provisioning agent 163 can run as a DPU sysprep boot option of the DPU device 109. This can prevent outside network connectivity to a local area network (LAN) and wide area network (WAN). The DPU provisioning agent 163 can also include a host-facing packet filter that allows communications from the host provisioning agent 158 and prevents outside network connectivity outside of the DPU device 109 and host device 106. The DPU provisioning agent 163 can wait for a command from the host provisioning agent 158. The command can be a provisioning command or an operating system boot command.

The provisioning command can cause the DPU provisioning agent 163 to download and install (or update) the DPU management operating system 165 on the DPU device 109. The DPU provisioning data such as configurations can also be applied or updated. Once the DPU management operating system 165 is installed and booted, the DPU provisioning agent 163 can then transmit a signal to the host provisioning agent 158 that the DPU management operating system 165 is ready for the management hypervisor 155 and the host operating system 150 to be launched. The operating system boot command can cause the DPU provisioning agent 163 to boot an already-installed DPU management operating system 165 on the DPU device 109. Once the DPU management operating system 165 is booted, the DPU provisioning agent 163 can then transmit a signal to the host provisioning agent 158 that the DPU management operating system 165 is ready for the management hypervisor 155 and the host operating system 150 to be launched.

The management hypervisor 155 can include a bare metal or type 1 hypervisor that can provide access to the physical memory, physical processors, physical data storage, and physical network resources of the host devices 106 to perform workloads 130. A management hypervisor 155 can create, configure, reconfigure, and remove virtual machines and other virtual devices on a host device 106. The management hypervisor 155 can also relay instructions from the management service 120 to the DPU management operating system 165. In other cases, the management service 120 can communicate with the DPU management operating system 165 directly. The management hypervisor 155 can identify that a workload 130 or a portion of a workload 130 includes instructions that can be executed using the DPU device 109, and can offload these instructions to the DPU device 109.

The BMC 159 can include a specialized processor, chip, system-on-chip, or other hardware devices used for remote monitoring and management of the host device 106. The BMC 159 can be part of the motherboard or baseboard of the host device 106. The BMC 159 can be accessed using a network connection. The BMC 159 can access the installer server component using this network connection, although the BMC 159 can be considered part of the same host device 106 by being located on the motherboard.

The BMC 159 can include the ability to power off, power on, and otherwise power cycle the host device 106. The BMC 159 can include or use sensors to identify hardware and software configurations of the host device 106. For example, the BMC 159 can identify a list of all the DPU devices 109 installed to the host device 106. The BMC 159 can also include the ability to transmit commands to the DPU device 109 using BMC-to-DPU interfaces such as network controller sideband interface (NC-SI), General Purpose Input/Output (GPIO), Serial Peripheral Interface (SPI), Inter-Integrated Circuit (I2C or IIC), synchronous or asynchronous serial busses, and others.

The DPU management operating system 165 can be a management-service-specific operating system that enables the management service 120 to manage the DPU device 109 and assign workloads 130 to execute using its resources. The DPU management operating system 165 can communicate with the management hypervisor 155 and/or with the management service 120 directly to provide access to the physical memory, physical processors, physical data storage, physical network resources, and physical accelerator resources of the DPU devices 109. However, the DPU management operating system 165, or an up-to-date version of the DPU management operating system 165 may not be initially installed to the DPU device 109. In some cases, since the DPU devices 109 can vary in form and function, DPU management operating system 165 can be DPU-device-type specific for a device type such as a manufacturer, product line, or model type of a DPU device 109.

Figure 2:
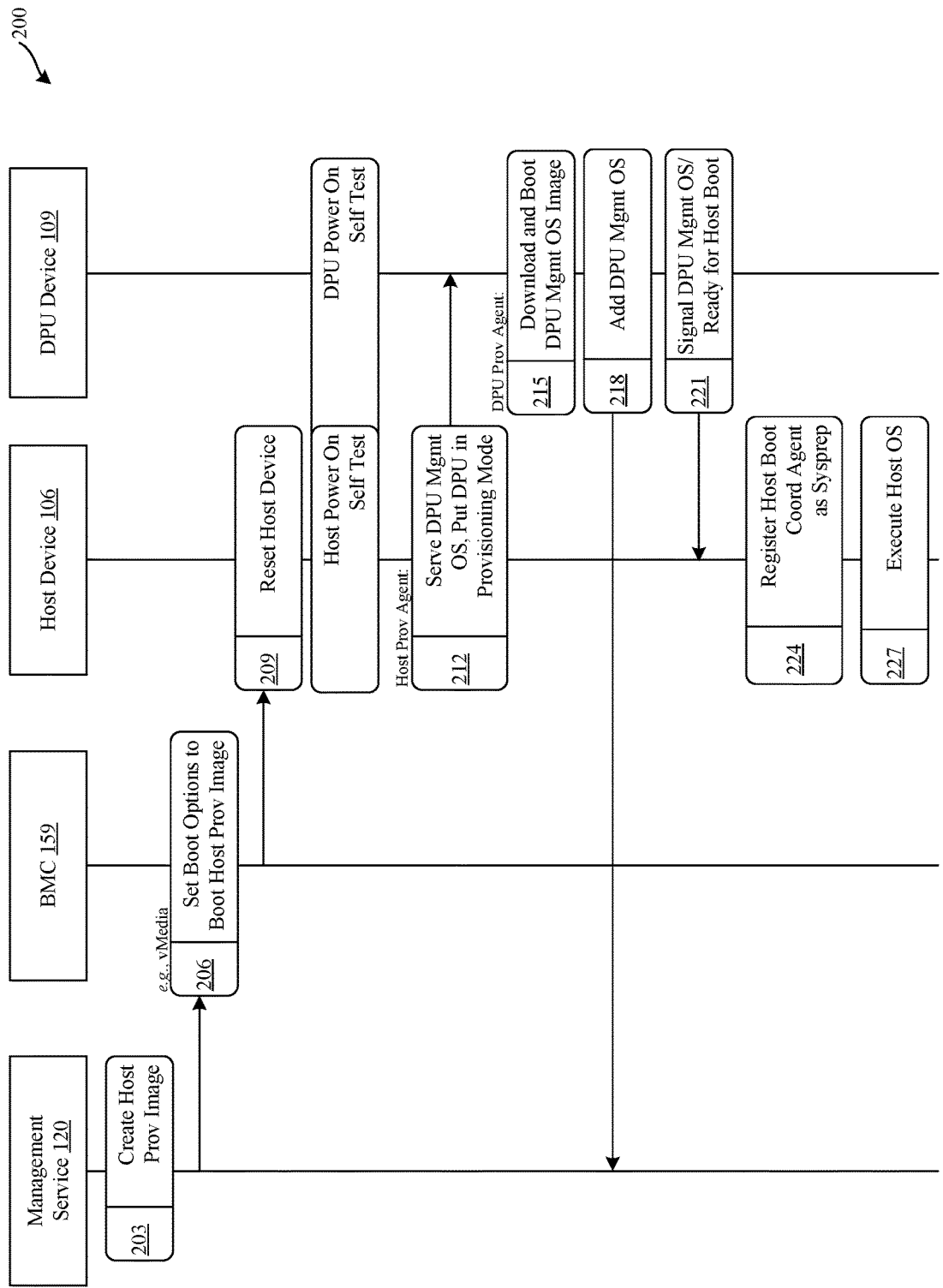
FIG. 2 is a sequence diagram that provides an example of the operation of components of the networked environment of FIG. 1, according to the present disclosure.

FIG. 2 is a sequence diagram 200 that provides an example of the operation of components of the networked environment 100 to provision a DPU device 109 with a DPU management operating system 165. While a particular step can be discussed as being performed by a particular hardware or software component of the networked environment 100, other components can perform aspects of that step. Generally, this figure shows how the components work in concert to provision the DPU device 109 with an initial, new, or updated DPU management operating system 165. In some examples, a DPU provisioning agent 163 can be manufacturer-installed or installed by an information technology professional prior to the described process.

In step 203, the management service 120 can create a host provisioning image 156. An administrative user can specify, through a user interface of the management service 120, a host boot coordination agent 157, a host provisioning agent 158, a DPU management operating system 165 image or installer, and a specified set of DPU provisioning data used by the DPU management operating system 165. The DPU provisioning data can include SDN information, a desired IP address or another network address for DPU management operating system 165 communications with software components of the host device 106, credentials to authenticate with the management service 120, a WAN-distributed edge configuration, as well as network storage configurations. The management service 120 can transmit the host provisioning image 156 to the host device 106 or the BMC 159.

In step 206, the BMC 159, or another component of the host device 106 can set boot options and order so that the host device 106 is configured to boot the host provisioning image 156 on next startup. For example, the BMC 159 can attach the host provisioning image 156 as virtual media of the BMC 159, and set boot options and order of the host device 106 to boot the virtual media from the BMC 159. Alternatively, the BMC 159 or another component can set boot options and order of the host device 106 to boot the host provisioning image 156 stored to another data store 123 accessible to the host device 106 or the BMC 159.

In step 209, the BMC 159 can transmit a command to reset or power cycle the host device 106. Alternatively, the management component 151 can transmit the command to reset or power cycle the host device 106. The host device 106 can then power off and power on. Power for the DPU device 109 can be provided by the host device 106. As a result, the DPU device 109 can power cycle substantially concurrently with the host device 106. The devices can perform their respective power on self tests.

The host device 106 can boot the host provisioning image 156. The host provisioning image 156 can initially boot to the host provisioning agent 158. The host provisioning image 156 can also install the host boot coordination agent 157 on the host device 106, and set boot options and order of the host device 106 to boot to the host boot coordination agent 157 as system preparation or sysprep on subsequent startups.

The DPU device 109 can boot the DPU provisioning agent 163. The DPU provisioning agent 163 can cause the DPU device 109 to prevent external communications such as DPU device 109 and host device 106 communications over a host-external LAN or WAN. The DPU provisioning agent 163 can wait for a command from the host device 106. The command can include a provisioning command or an operating system boot command. The DPU provisioning agent 163 can enable communications through a single IP address, or multiple IP addresses. Link-local addresses and/or VMCI-over-IP can be used as a channel for host-DPU communications. Alternatively, host-DPU communications can include communications using NC-SI, synchronous or asynchronous serial busses, PCIe, I2C, SPI, and GPIO among others.

In step 212, the host provisioning agent 158 can serve a DPU provisioning image or DPU management operating system 165 image that includes the DPU management operating system 165 and device-specific DPU provisioning data. host provisioning agent 158 can launch a server component that serves the DPU provisioning image. The host provisioning agent 158 can also transmit a provisioning command that puts the DPU provisioning agent 163 in provisioning mode.

In step 215, the DPU provisioning agent 163 can receive the provisioning command and can download the DPU provisioning image or otherwise download the DPU management operating system 165 image and device-specific DPU provisioning data from the server component of the host provisioning agent 158. The DPU provisioning agent 163 can set its boot options and order, and boot to the DPU management operating system 165. The DPU provisioning agent 163 can lift the restriction of external network communications immediately prior to or immediately after executing the DPU management operating system 165. Alternatively, the DPU device 109 can power cycle without affecting the host device 106 power, and the restriction of external network communications can be lifted or otherwise not applied when booting to the DPU management operating system 165.

In step 218, the DPU management operating system 165 can transmit a command to add itself (and/or the DPU device 109) to the management service 120 for management. This can include transmitting DPU device data such as a serial number or another DPU device identifier to the management service 120. The command can also be transmitted along with host device data such as a serial number or identifier of the host device 106 to which the DPU device 109 is installed. The command can be authenticated using management service authentication credentials that are included in the DPU provisioning data. The DPU management operating system 165 can be configured to register itself the first time it is booted, or each time it is booted.

In step 221, the DPU management operating system 165 or the DPU provisioning agent 163 can transmit a host operating system boot command. The host operating system boot command can include a signal that the DPU management operating system 165 is executing and is ready for the host operating system 150 to boot.

In step 224, the host provisioning agent 158 can install or store the host boot coordination agent 157, and set boot options and order, and order to boot to the host boot coordination agent 157. The host provisioning agent 158 can set the host boot coordination agent 157 as a system preparation or sysprep option on subsequent startups.

In step 227, the host provisioning agent 158 can cause the host device 106 to execute the host operating system 150. This can include allowing the system startup process to continue. Alternatively, the host provisioning agent 158 can cause the host device 106 to reboot at this point, and the process can proceed according to FIG. 3.

Figure 3:
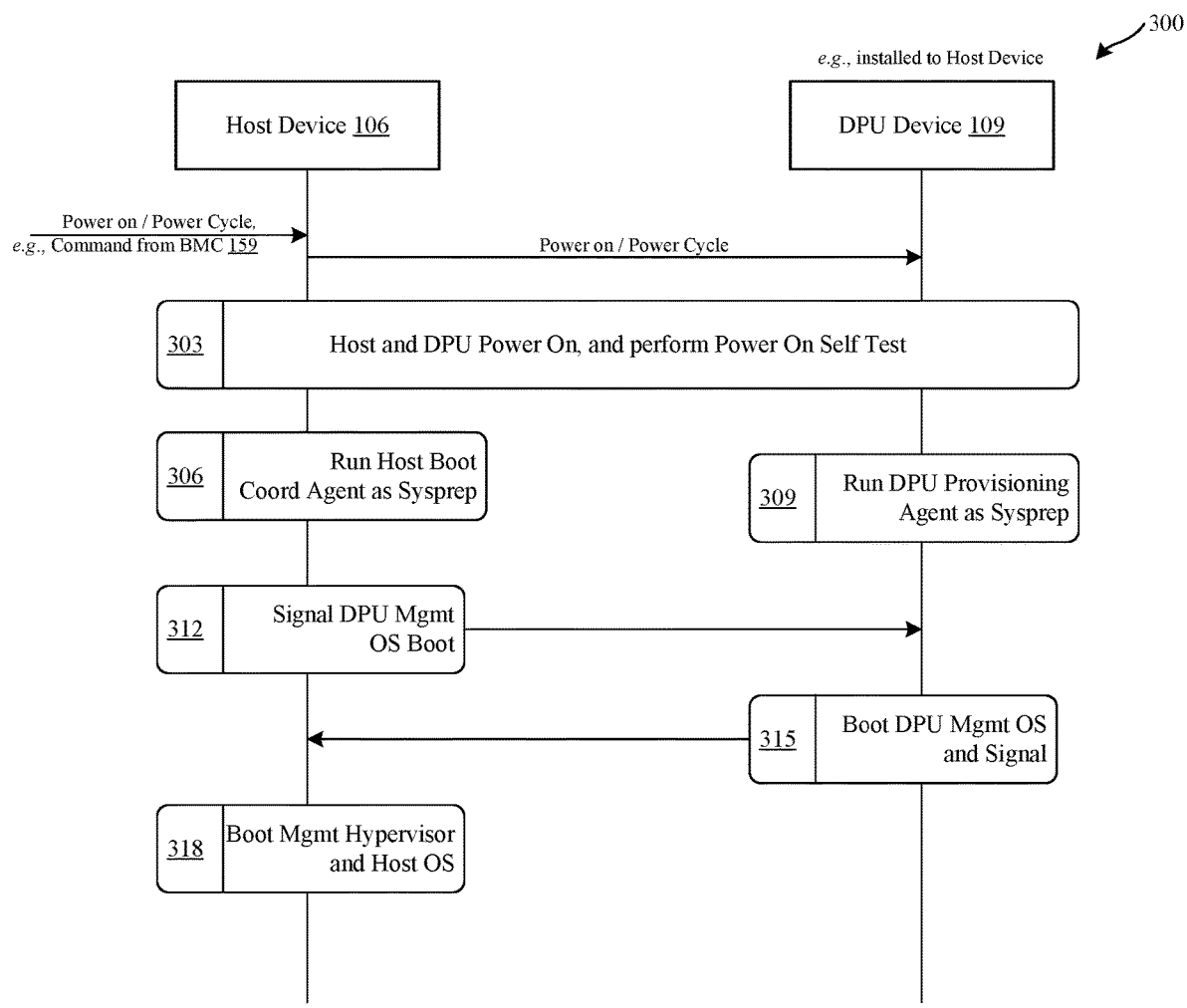
FIG. 3 is a sequence diagram that provides another example of the operation of components of the networked environment of FIG. 1, according to the present disclosure.

FIG. 3 is a sequence diagram that provides an example of the operation of components of the networked environment 100 to boot a DPU device 109 with a DPU management operating system 165 that is provisioned according to the process of FIG. 2. While a particular step can be discussed as being performed by a particular hardware or software component of the networked environment 100, other components can perform aspects of that step.

In step 303, the host device 106 and the DPU device 109 can perform their power on self tests and other initial boot operations. This process can begin with a power on or reset of the DPU device 109. For example, the BMC 159 can reset the DPU device 109, or an intentional or unintentional power cycle of the host device 106 can power cycle the DPU device 109.

In step 306, the host device 106 can execute the host boot coordination agent 157 as a system preparation or sysprep boot option. The host provisioning image 156 or host provisioning agent 158 can install the host boot coordination agent 157 and set the host boot options and order to run the host boot coordination agent 157 as a boot time system preparation option.

In step 309, the DPU device 109 can execute the DPU provisioning agent 163 as a system preparation or sysprep boot option. The host provisioning image 156 or host provisioning agent 158 can install the DPU provisioning agent 163 and set the DPU boot options and order to run the DPU provisioning agent 163 as a boot time system preparation option.

In step 312, the host boot coordination agent 157 can signal for the DPU management operating system 165 to boot on the DPU device 109. The host boot coordination agent 157 can transmit an operating system boot command to a predetermined IP address of the DPU device 109. This IP address can be a same IP address that is specified by the DPU provisioning data and whitelisted or left open for communications by a network packet filter that is established by the DPU provisioning agent 163 or other instructions executed by the DPU device 109. The network packet filter can also prevent host-external communications.

In step 315, the DPU provisioning agent 163 can wait until the operating system boot command is received, and then boot to the DPU management operating system 165. Once the DPU management operating system 165 is running, the DPU provisioning agent 163 or the DPU management operating system 165 can transmit a command to boot the host operating system 150. The command can include a signal or parameter transmitted to the host device 106.

In step 318, the host boot coordination agent 157 can receive the signal and allow the boot process to continue. This can include executing the management hypervisor 155 and the host operating system 150.

Figure 4:
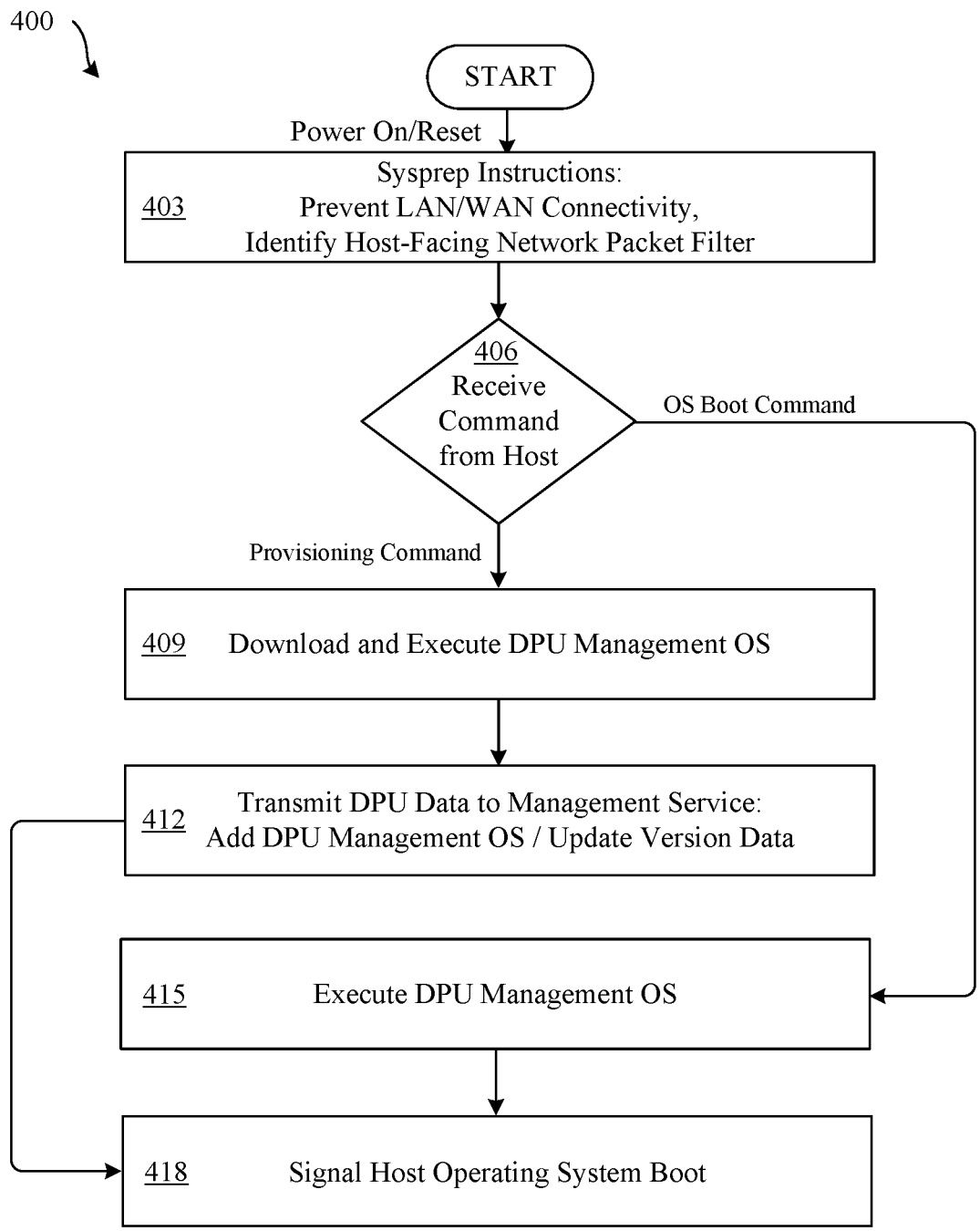
FIG. 4 is a flowchart illustrating functionality implemented by components of the networked environment, according to the present disclosure.

FIG. 4 shows a flowchart 400 that provides an example of the operation of components of the networked environment 100 to provision or boot a DPU device 109. While a particular step can be discussed as being performed by a particular hardware or software component of the networked environment 100, other components can perform aspects of that step.

Generally, this figure shows how the DPU provisioning agent 163 works in concert with other components in order to securely provision the DPU device 109 with the DPU management operating system 165 or boot to an installed DPU management operating system 165 prior to running the host operating system 150. This can include limiting or preventing host-external network access prior to running the DPU management operating system 165.

In step 403, the DPU provisioning agent 163 can execute as a system preparation boot option of the DPU device 109. The DPU provisioning agent 163 can prevent LAN and WAN connectivity. This can include identification of a host-facing network packet filter that whitelists or otherwise enables the DPU provisioning agent 163 to receive communications at a particular IP address. The DPU provisioning agent 163 can then wait to receive a command from the host device 106.

In step 406, the DPU provisioning agent 163 can receive a command from a software component of the host device 106. This can include the host boot coordination agent 157 or the host provisioning agent 158. Generally, the host provisioning agent 158 can provide a provisioning command, while the host boot coordination agent 157 can provide an operating system boot command. If the provisioning command is received, then the process can proceed to step 409. Otherwise, if the operating system boot command is received, then the process can proceed to step 415.

In step 409, the DPU provisioning agent 163 can download and execute a DPU management operating system 165 that is already installed or stored to the DPU device 109. The DPU provisioning agent 163 can download the DPU management operating system 165 as a DPU provisioning image along with additional DPU provisioning data. The DPU provisioning agent 163 can download the DPU provisioning image from an endpoint provided by a server component launched or provided by the host provisioning agent 158. In some examples, the DPU provisioning agent 163 can allow communications with the endpoint on startup, and in other examples, the endpoint can be enabled for communications once the provisioning command is received. The endpoint can be predetermined, or can be received as part of the provisioning command. Once installed, the DPU device 109 can boot or execute the DPU management operating system 165.

In step 412, the DPU provisioning agent 163 or the DPU management operating system 165 can transmit DPU data to the management service 120. The transmitted DPU data can include adding the DPU device 109 and the DPU management operating system 165 instance to the management service 120. The transmitted DPU data can also update version data or other information of the DPU management operating system 165. The DPU provisioning agent 163 can enable host-external LAN and WAN communications once the DPU management operating system 165 is executed.

In step 415, in an instance in which the operating system boot command is received, the DPU provisioning agent 163 can cause the DPU device 109 to execute the DPU management operating system 165 that is already installed on the DPU device 109. The DPU provisioning agent 163 can enable host-external LAN and WAN communications once the DPU management operating system 165 is executed.

In step 418, the DPU provisioning agent 163 or the DPU management operating system 165 can signal for the host operating system 150 to boot. This can include an indication that the DPU management operating system 165 is executing and ready for the host operating system 150 to boot. The host boot coordination agent 157 can receive this command and proceed to boot the management hypervisor 155 and the host operating system 150.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory devices can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagrams and flowcharts can show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or another system. The machine code can be converted from the source code. If embodied in hardware, each block can represent a circuit or a number of interconnected circuits to implement the specified logical function(s).

Although sequence diagrams and flowcharts can be shown in a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or another system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included in the following claims herein, within the scope of this disclosure.

Therefore, the following is claimed:

1. A non-transitory computer-readable medium comprising executable instructions, wherein the instructions, when executed by at least one processor, cause at least one computing device to perform operations comprising:
    booting, by a host device, a host provisioning image comprising: a host provisioning agent, and a data processing unit (DPU) management operating system (OS);
    executing, by the host device, the host provisioning agent, wherein the host provisioning agent launches a server component that serves the DPU management OS;
    transmitting, by the host device, a provisioning command to a DPU device installed to the host device;
    transmitting, by the server component, the DPU management OS from the host device to the DPU device;
    receiving, from the DPU device, an indication that the DPU device is executing the DPU management OS;
    updating, by the host provisioning agent, host boot options of the host device to boot a host boot coordination agent prior to boosting a host OS; and
    executing, by the host device, the host OS based at least in part on the indication that the DPU device is executing the DPU management OS.

2. The non-transitory computer-readable medium of claim 1, the operations further comprising:
    receiving, by a baseboard management controller (BMC), the host provisioning image from a management service; and
    updating, by the BMC, the host boot options of the host device to boot the host provisioning image.

3. The non-transitory computer-readable medium of claim 2, the operations further comprising:
    transmitting, by the BMC, a command that resets the host device, wherein the host device boots the host provisioning image once the host device resets.

4. The non-transitory computer-readable medium of claim 2, wherein the BMC updates the host boot options to boot the host provisioning image from a virtual media of the BMC.

5. The non-transitory computer-readable medium of claim 1, wherein the host provisioning image further comprises the host boot coordination agent that communicates with a DPU provisioning agent that is executed on the DPU device.

6. The non-transitory computer-readable medium of claim 5, the operations further comprising:
    preventing network connectivity outside the host device until the DPU device has started executing the DPU management OS.

7. The non-transitory computer-readable medium of claim 1, wherein the host provisioning agent sets the host boot coordination agent as a system preparation boot option of the host device.

8. A system, comprising:
    at least one computing device comprising at least one processor; and
    a data store comprising executable instructions, wherein the instructions, when executed by the at least one processor, cause the at least one computing device to at least: perform operations comprising:
        booting, by a host device, a host provisioning image comprising: a host provisioning agent, and a data processing units (DPU) management operating system (OS);
        executing, by the host device, the host provisioning agent, wherein the host provisioning agent launches a server component that serves the DPU management OS;
        transmitting, by the host device, a provisioning command to a DPU device installed to the host device;
        transmitting, by the server component, the DPU management OS from the host device to the DPU device;
        receiving, from the DPU device, an indication that the DPU device is executing the DPU management OS;
        updating, by the host provisioning agent, host boot options of the host device to boot a host boot coordination agent prior to the host OS; and
        executing by the host device, the host OS based at least in part on the indication that the DPU device is executing the DPU management OS.

9. The system of claim 8, the operations further comprising:
    receiving, by a baseboard management controller (BMC), the host provisioning image from a management service; and
    updating, by the BMC, the host boot options of the host device to boot the host provisioning image.

10. The system of claim 9, the operations further comprising:
    transmitting, by the BMC, a command that resets the host device, wherein the host device boots the host provisioning image once the host device resets.

11. The system of claim 9, wherein the BMC updates the host boot options to boot the host provisioning image from a virtual media of the BMC.

12. The system of claim 8, wherein the host provisioning image further comprises the host boot coordination agent that communicates with a DPU provisioning agent that is executed on the DPU device.

13. The system of claim 12, the operations further comprising:
preventing network connectivity outside the host device until the DPU device has started executing the DPU management OS.

14. The system of claim 13, wherein the host provisioning agent sets the host boot coordination agent as a system preparation boot option of the host device.

15. A method, comprising:
booting, by a host device, a host provisioning image comprising: a host provisioning agent, and a data processing units (DPU) management operating system (OS);
executing, by the host device, the host provisioning agent, wherein the host provisioning agent launches a server component that serves the DPU management OS;
transmitting, by the host device, a provisioning command to a DPU device installed to the host device;
transmitting, by the server component, the DPU management OS from the host device to the DPU device;
receiving, from the DPU device, an indication that the DPU device is executing the DPU management OS;
updating, by the host provisioning agent, host boot options of the host device to boot a host boot coordination agent prior to boosting a host OS; and
executing, by the host device, the host OS based at least in part on the indication that the DPU device is executing the DPU management OS.

16. The method of claim 15, further comprising:
receiving, by a baseboard management controller (BMC), the host provisioning image from a management service; and
updating, by the BMC, the host boot options of the host device to boot the host provisioning image.

17. The method of claim 16, further comprising:
transmitting, by the BMC, a command that resets the host device, wherein the host device boots the host provisioning image once the host device resets.

18. The method of claim 16, wherein the BMC updates the host boot options to boot the host provisioning image from a virtual media of the BMC.

19. The method of claim 15, wherein the host provisioning image further comprises the host boot coordination agent that communicates with a DPU provisioning agent that is executed on the DPU device.

20. The method of claim 15, wherein the host provisioning agent prevents the host OS from launching until the DPU device has started executing the DPU management OS.

* * * * *